US 6,687,702 B2

(12) United States Patent
Vaitheeswaran et al.

(10) Patent No.: US 6,687,702 B2
(45) Date of Patent: Feb. 3, 2004

(54) METHODOLOGY PROVIDING HIGH-SPEED SHARED MEMORY ACCESS BETWEEN DATABASE MIDDLE TIER AND DATABASE SERVER

(75) Inventors: Girish Vaitheeswaran, Fremont, CA (US); Prasanta Ghosh, Alameda, CA (US); Taghi Fatemi, Puteaux (FR)

(73) Assignee: Sybass, Inc., Dublin, CA (US)

( * ) Notice: Subject to any disclaimer, the term of this patent is extended or adjusted under 35 U.S.C. 154(b) by 289 days.

(21) Appl. No.: 09/965,231

(22) Filed: Sep. 25, 2001

(65) Prior Publication Data

US 2003/0014552 A1 Jan. 16, 2003

Related U.S. Application Data

(60) Provisional application No. 60/298,660, filed on Jun. 15, 2001.

(51) Int. Cl.[7] .............................................. G06F 17/30
(52) U.S. Cl. ...................... 707/10; 707/104.1
(58) Field of Search ......................... 707/1, 2, 3, 4, 707/5, 6, 7, 8, 9, 10, 100, 101, 103, 104

(56) References Cited

U.S. PATENT DOCUMENTS 6,085,198 A * 7/2000 Skinner et al. ......... 707/103 R
6,442,552 B1 * 8/2002 Frolund et al. ............... 707/10
6,463,439 B1 * 10/2002 Dahlberg .................... 707/100

OTHER PUBLICATIONS

De Michiel et al., Enterprise JavaBeans Specification, Version 2.0, Sun Microsystems, Aug. 14, 2001.

* cited by examiner

Primary Examiner—Diane D. Mizrahi
Assistant Examiner—Yicun Wu
(74) Attorney, Agent, or Firm—John A. Smart

(57) ABSTRACT

A multi-tier database system is modified such that a middle-tier application server (EJB server) and a database server run on the same host computer and communicate via shared-memory interprocess communication. The system includes a database (e.g., JDBC) driver thread that attaches to the database server, specifically by attaching to the database server's shared memory segment. Operation of the JDBC driver is modified to provide direct access between the middle tier (i.e., EJB server) and the database server, when the two are operating on the same host computer.

43 Claims, 8 Drawing Sheets

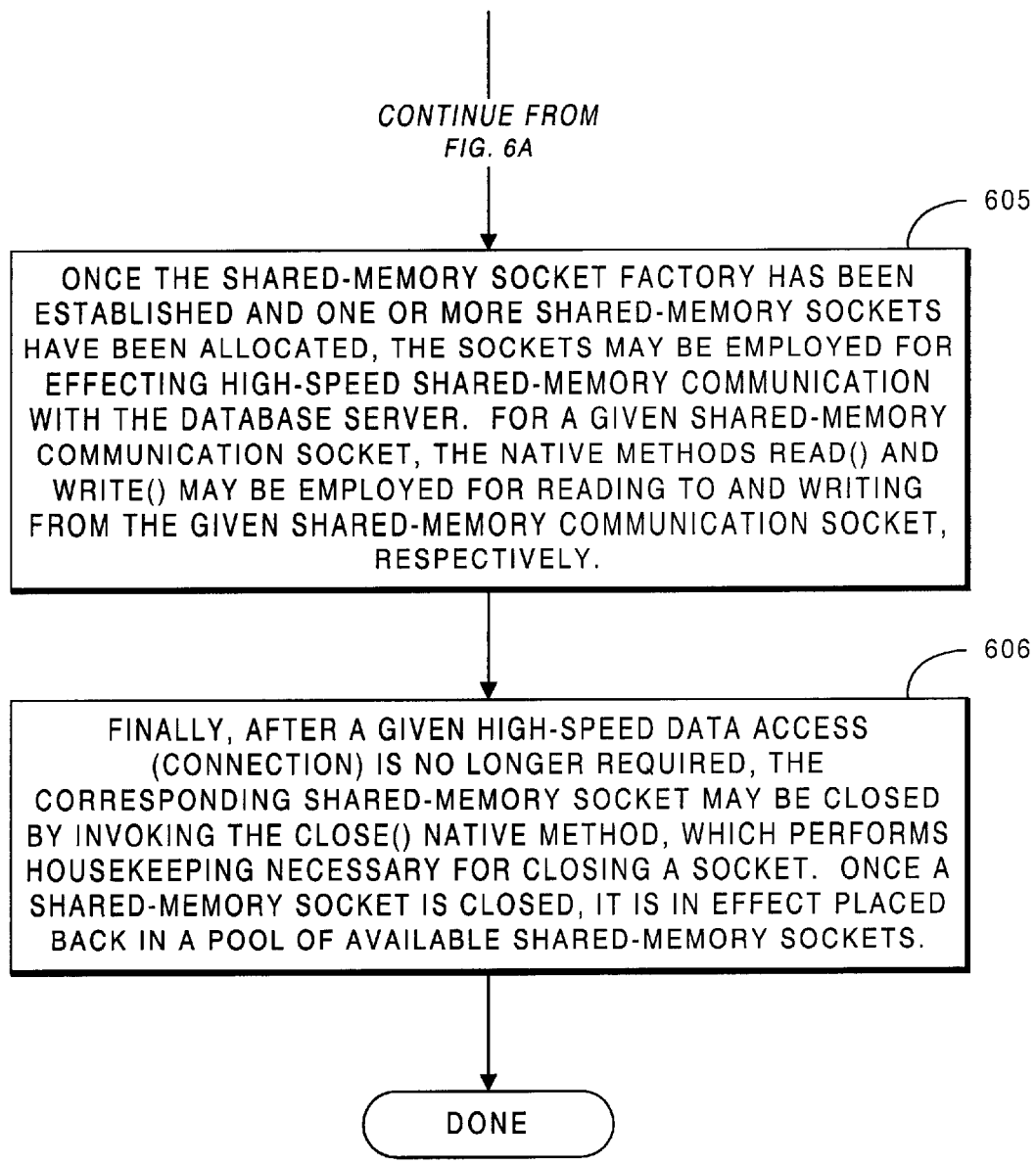

METHODOLOGY PROVIDING HIGH-SPEED SHARED MEMORY ACCESS BETWEEN DATABASE MIDDLE TIER AND DATABASE SERVER

RELATED APPLICATIONS

The present application is related to, and claims the benefit of priority of, the following commonly-owned provisional application(s): application Ser. No. 60/298,660 (SYB/0075.01), filed Jun. 15, 2001, entitled "High Speed Shared Memory Access Between Database Middle Tier and Database Server," of which the present application is a non-provisional application thereof. The disclosure of the foregoing application is hereby incorporated by reference in its entirety, including any appendices or attachments thereof, for all purposes.

COMPUTER PROGRAM LISTING APPENDIX

This application includes a transmittal under 37 C.F.R. §1.52(e) of a Computer Program Listing Appendix comprising duplicate compact discs (2), respectively labeled "Copy 1" and "Copy 2". The discs are IBM-PC machine formatted and Microsoft® Windows Operating System compatible, and include identical copies of the following list of files:

| File Name | Created/Last Modified | File Size (KB) |
| --- | --- | --- |
| Source Code.txt | Sep. 25, 2001 | 224 |

All of the material disclosed in the Computer Program Listing Appendix is hereby incorporated by reference into the present application.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to distributed (e.g., three-tier) computing systems and, more particularly, to a system and methods for improving data access and operation in distributed computer environments.

2. Description of the Background Art

Today, most computers are linked to other computer systems via a computer network. Well-known examples of computer networks include local-area networks (LANs) where the computers are geographically close together (e.g., in the same building), and wide-area networks (WANs) where the computers are farther apart and are connected by telephone lines or radio waves.

Often, networks are configured as "client/server" networks, such that each computer on the network is either a "client" or a "server." Servers are powerful computers or processes dedicated to managing shared resources, such as storage (i.e., disk drives), printers, modems, or the like. Servers are often dedicated, meaning that they perform no other tasks besides their server tasks. For instance, a database server is a computer system that manages database information, including processing database queries from various clients. The client part of this client/server architecture typically comprises PCs or workstations that rely on a server to perform some operations. Typically, a client runs a "client application" that relies on a server to perform some operations, such as returning particular database information. Often, client/server architecture is thought of as a "two-tier architecture," one in which the user interface runs on the client or "front end" and the database is stored on the server or "back end." The actual business rules or application logic driving operation of the application can run on either the client or the server (or even be partitioned between the two). In a typical deployment of such a system, a client application, such as one created by an information service (IS) shop, resides on all of the client or end-user machines. Such client applications interact with host database engines (e.g., Sybase® Adaptive Server®), executing business logic that traditionally ran at the client machines.

More recently, the development model has shifted from standard client/server or two-tier development to a three-tier, component-based development model. This newer client/server architecture introduces three well-defined and separate processes, each typically running on a different platform. A "first tier" provides the user interface, which runs on the user's computer (i.e., the client). Next, a "second tier" provides the functional modules that actually process data. This middle tier typically runs on a server, often called an "application server." A "third tier" furnishes a database management system (DBMS) that stores the data required by the middle tier. This tier may run on a second server called the database server.

The three-tier design has many advantages over traditional two-tier or single-tier designs. For example, the added modularity makes it easier to modify or replace one tier without affecting the other tiers. Separating the application functions from the database functions makes it easier to implement load balancing. Thus, by partitioning applications cleanly into presentation, application logic, and data sections, the result will be enhanced scalability, reusability, security, and manageability.

Three-tier database systems are well documented in the patent and trade literature; see, e.g., U.S. Pat. No. 6,266,666, entitled "Component transaction server for developing and deploying transaction-intensive business applications," the disclosure of which is hereby incorporated by reference.

In the three-tier model, communication must occur among the various tiers, such as from a client to a middle tier, and from the middle tier to a back-end database. A multitude of message traffic or communication flows between the client and the database, with the middle tier positioned in between. One of the advantages of employing a middle tier is to pool together connections to the database in a central (middleware) tier, thus allowing more efficient access to the database. In particular, database connections, which are expensive in terms of system and network resources, are cached in the middle tier.

Another advantage of the middle tier is to offload certain computations from the back-end database, particularly those pertaining to business logic (i.e., business objects). Exploiting this advantage, a system administrator would deploy a middle tier on a separate server computer, one that was physically separate from the computer hosting the back-end database. More recently, however, hardware vendors have released more powerful computers such that both the middle tier and the back-end database may now easily run on the same host, a single physical computer. One such computer is Sun's StarFire computer (Sun Microsystems of Mountain View, Calif.); it employs 64 processors, running under a 64-bit operating system, with access to a 64G memory space. As a result of this more powerful hardware architecture now available, the approach of deploying a middle tier on a separate physical computer is no longer a necessity. In some instances, it may be more cost effective to deploy and maintain the middle tier and the back-end database on the same computer.

Typically, any business logic modeled on a middle tier requires significant, if not substantial, access to the back-end database. For example, SQL queries may be passed from the middle tier to the database, with corresponding result sets being returned back to the middle tier (and then onto the relevant client). If a particular query result is large, a corresponding large data set (and accompanying messages) must be transmitted back to the middle tier. Therefore, in a classic configuration, where a middle tier exists on a separate machine, a lot of network communication occurs between the middle tier and the database. In the instance where the middle tier and database reside on a single computer, physical (e.g., Ethernet) network traffic is avoided. However, the communication process is still resource intensive, as the underlying communication protocol stack (e.g., TCP/IP) is still used to effect communication between the middle tier and the database. Accordingly, system performance is negatively impacted.

Another disadvantage that comes to light is of the potential for breach of security. Even when the middle tier and database are on the same physical machine, it is still possible for an unauthorized individual to gain access to the communications occurring between the two. Again, this results from the underlying communication protocol stack employed to effect the communication. Although the communications may be encrypted (e.g., using SSL, Secured Socket Layer), such encryption adds additional overhead to the system, thus impacting overall system performance.

To date, attempts to address the foregoing problems have focused on optimizing network communication. For example, using a "loop back" optimization, communication between two processes (e.g., a middle tier and a database) may be improved if both are residing on one host. Here, the host is specified to be a local host. As a result, certain driver-level optimizations may occur at the level of the underlying TCP/IP driver (used to effect communication). However, that approach has the distinct disadvantage of affecting the visibility of the host (across the entire network). Moreover, the approach still relies on network communication occurring between the middle tier and the database, even though both processes may reside on one physical machine. Accordingly, a better solution is sought.

GLOSSARY

The following definitions are offered for purposes of illustration, not limitation, in order to assist with understanding the discussion that follows.

Application server (also appserver): A program that handles all application operations between users and an organization's back-end business applications or databases. Application servers are typically used for complex transaction-based applications. To support high-end needs, an application server has to have built-in redundancy, monitors for high-availability, high-performance distributed application services, and support for complex database access.

Driver: A program that performs a set of specialized tasks, such as serving as a translator between different programs and/or devices.

Enterprise JavaBeans (also, EJB and Enterprise Java Beans): EJB is a widely-adopted server-side component architecture for the Java 2 Platform, Enterprise Edition (J2EETM), that enables rapid development of mission-critical applications that are versatile, reusable, and portable across middleware while protecting IT investment and preventing vendor lock-in. EJB is a specification that defines an EJB component architecture and the interfaces between the EJB technology-enabled server and the component. For further description, see, e.g., Enterprise Java-Bean Specification, Version 2.0, available from Sun Microsystems.

Interprocess communication (IPC): A capability supported by many operating systems that allows one process to communicate with another process. The processes can be running on the same computer or on different computers connected through a network. IPC enables one application to control another application, and for several applications to share the same data without interfering with one another. Examples of IPC in the Microsoft Windows environment include Dynamic Data Exchange (DDE) and Windows Clipboard.

Java: A general purpose programming language developed by Sun Microsystems. Java is an object-oriented language similar to C++, but simplified to eliminate language features that cause common programming errors. Java source code files (files with a java extension) are compiled into a format called bytecode (files with a class extension), which can then be executed by a Java interpreter. Compiled Java code can run on most computers because Java interpreters and runtime environments, known as Java Virtual Machines (JVMs), exist for most operating systems, including UNIX, the Macintosh OS, and Windows. Bytecode can also be converted directly into machine language instructions by a just-in-time (JIT) compiler.

Java Beans (also JavaBeans): A specification developed by Sun Microsystems that defines how Java objects interact. An object that conforms to this specification is called a Java Bean, and is similar to an ActiveX control. It can be used by any application that understands the Java Beans format. The principal difference between ActiveX controls and Java Beans are that ActiveX controls can be developed in any programming language but executed only on a Windows platform, whereas Java Beans can be developed only in Java, but can run on any platform.

Java Native Interface (JNI): A Java programming interface that allows developers to access the languages of a host system and determine the way Java integrates with native code. JNI allows Java code that runs within a Java Virtual Machine (JVM) to operate with applications and libraries written in other languages, such as C, C++, and assembly. Programmers use the JNI to write native methods to handle those situations when an application cannot be written entirely in the Java programming language, especially for low-level operating system calls. For further description, see, e.g., Java Native Interface Specification, available from Sun Microsystems of Mountain View, Calif. Additional description may be found in the patent literature; see, e.g., U.S. Pat. No. 6,066,181.

Process: An executing program; sometimes used interchangeably with "task."

Semaphore: A hardware or software flag. In multitasking systems, a semaphore is a variable with a value that indicates the status of a common resource. It is used to lock the resource that is being used. A process needing the resource checks the semaphore to determine the resource's status and then decides how to proceed.

Thread: A part of a program that can execute independently of other parts. Operating systems that support multi-threading enable programmers to design programs whose threaded parts can execute concurrently.

SUMMARY OF THE INVENTION

In accordance with the present invention, a multi-tier database system is modified such that a middle-tier application server (EJB server) and a database server run on the same host computer and communicate via shared-memory interprocess communication. The system includes a JDBC (driver) thread that attaches to the database server, specifically by attaching to the database server's shared memory segment. Operation of the JDBC driver is modified in accordance with the present invention to provide direct access between the middle tier (i.e., EJB server) and the database server, when the two are operating on the same host computer.

The present invention introduces the notion of "external engines." The database server itself has an engine. Each engine, in turn, is a separate process (i.e., executing process). A "task" or "process" is a program in execution together with virtual memory containing instructions, data, and context information, such as descriptors for open files and communication channels. In accordance with the present invention, a multitude of engines are instantiated. Each engine communicates with other engines using the interprocess communication (IPC) technique of shared memory. In this manner, Enterprise Java Beans (EJB) support may itself be implemented as an external engine. More particularly, in the currently preferred embodiment, EJB services may be provided by an existing application server, the Sybase Enterprise Application Server (hereinafter, Application Server), which classically operates in the middle tier. In accordance with the present invention, the Application Server is modified to operate as an external engine. As part of this modification, the Application Server communicates with the back-end database server (e.g., Sybase Adaptive Server Enterprise, ASE) using shared-memory IPC. Further, a "fast path" high-speed shared memory driver is provided. The fast path memory driver attaches to a shared memory segment of the back-end database (e.g., Sybase ASE) and thereafter provides rapid data exchange/sharing between separate processes (e.g., separate UNIX or Windows NT processes), using shared-memory IPC.

One or more engines attach to the shared memory segment of the database server. One of those engines is the Application Server (EJB) engine, the process associated with the EJB server. In operation, during procurement of the first database connection, the JDBC driver or thread attaches by attaching to the key for the shared memory segment, which itself is an operating system handle (e.g., integer or logical name) that uniquely identifies the shared memory segment. All of the database server's in-memory data structures that are visible in shared memory, including for example locks, buffers, and the like, are visible to the attached engines. These data structures include send and receive buffers, which are employed for facilitating communication between the various clients/EJB server and the database server. As previously described, by virtue of the fact that the JDBC thread is attached to the shared memory segment, the thread's process—that is, the EJB engine (process)—also attaches to the shared memory segment. Even when the initial JDBC thread terminates, the process may remain attached. As a result, all subsequent threads (of the EJB engine) can automatically benefit from this existing attachment.

Operation is summarized as follows. The first client that is making a connection to the database (e.g., Java program executing at the Application Server) attaches to the back-end database shared memory. Here, a thread that is executing in the context of the Application Server (process) attaches to the back-end database shared memory. By virtue of the fact that a thread (e.g., Java program) has attached, the underlying process (i.e., Application Server process) also attaches to be shared memory. The attachment, which entails attachment to the underlying shared-memory "key" (i.e., an operating system construct), is done once. Upon attachment, all of the back-end database in-memory (public) data structures are visible to the Application Server, and thus may be accessed directly (using shared-memory IPC technique). All subsequent clients requiring connectivity to the database (i.e., all subsequent Java program threads running in the Application Server) make use of the fact that a process (i.e., the Application Server itself) has already attached to the database's memory space. These subsequent threads do not need to make individual attachments but, instead, take advantage of the existing attachment. Accordingly, all communications of the subsequent threads may occur over high-speed shared-memory IPC.

BRIEF DESCRIPTION OF THE DRAWINGS

FIGS. 6A–B comprise a flowchart diagram of the overall operation of the method of the present invention.

DETAILED DESCRIPTION OF A PREFERRED EMBODIMENT

The following description will focus on the presently preferred embodiment of the present invention, which is operative in a network environment executing component-based multi-tier application programs which interact with remote data, such as stored on an SQL database server. The present invention, however, is not limited to any particular application or environment. Instead, those skilled in the art will find that the present invention may be advantageously applied to any application or environment where optimization of database access performance is desirable. Further, the methods of the present invention may be advantageously embodied on a variety of different platforms, including Macintosh, Linux, BeOS, Solaris, UNIX, NextStep, FreeBSD, and the like. Therefore, the description of the exemplary embodiments that follows is for purposes of illustration and not limitation.

I. Computer-based Implementation

A. Basic System Hardware (e.g., for Desktop and Server Computers)

Figure 1:
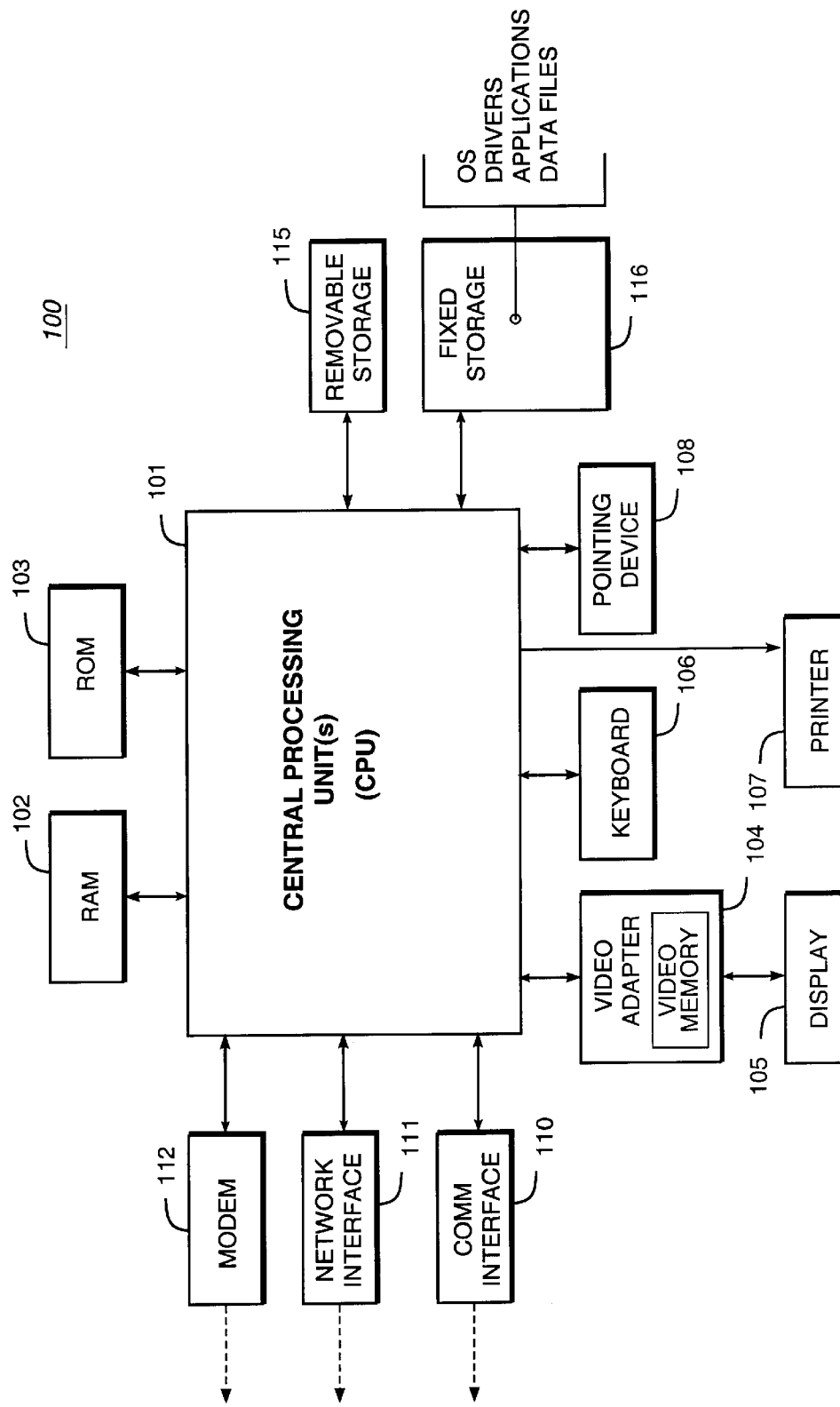
FIG. 1 is a block diagram of a computer system in which software-implemented processes of the present invention may be embodied.

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a pointing device 108, a display or video adapter 104 connected to a display device 105, a removable (mass) storage device 115 (e.g., floppy disk, CD-ROM, CD-R, CD-RW, or the like), a fixed (mass) storage device 116 (e.g., hard disk), a communication port(s) or interface(s) 110, a modem 112, and a network interface card (NIC) or controller 111 (e.g., Ethernet). Although not shown separately, a real-time system clock is included with the system 100, in a conventional manner.

CPU 101 comprises a processor of the Intel Pentium® family of microprocessors. However, any other suitable microprocessor or microcomputer may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixteen megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the storage device or mass storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the display screen 105. Likewise, the pointing device 108, such as a mouse, track ball, pen device, or the like, permits selection and manipulation of objects on the display screen. In this manner, these input devices support manual user input for any process running on the system.

The computer system 100 displays text and/or graphic images and other data on the display device 105. The video adapter 104, which is interposed between the display 105 and the system, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet® printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication ("comm") interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

B. Basic System Software

Figure 2:
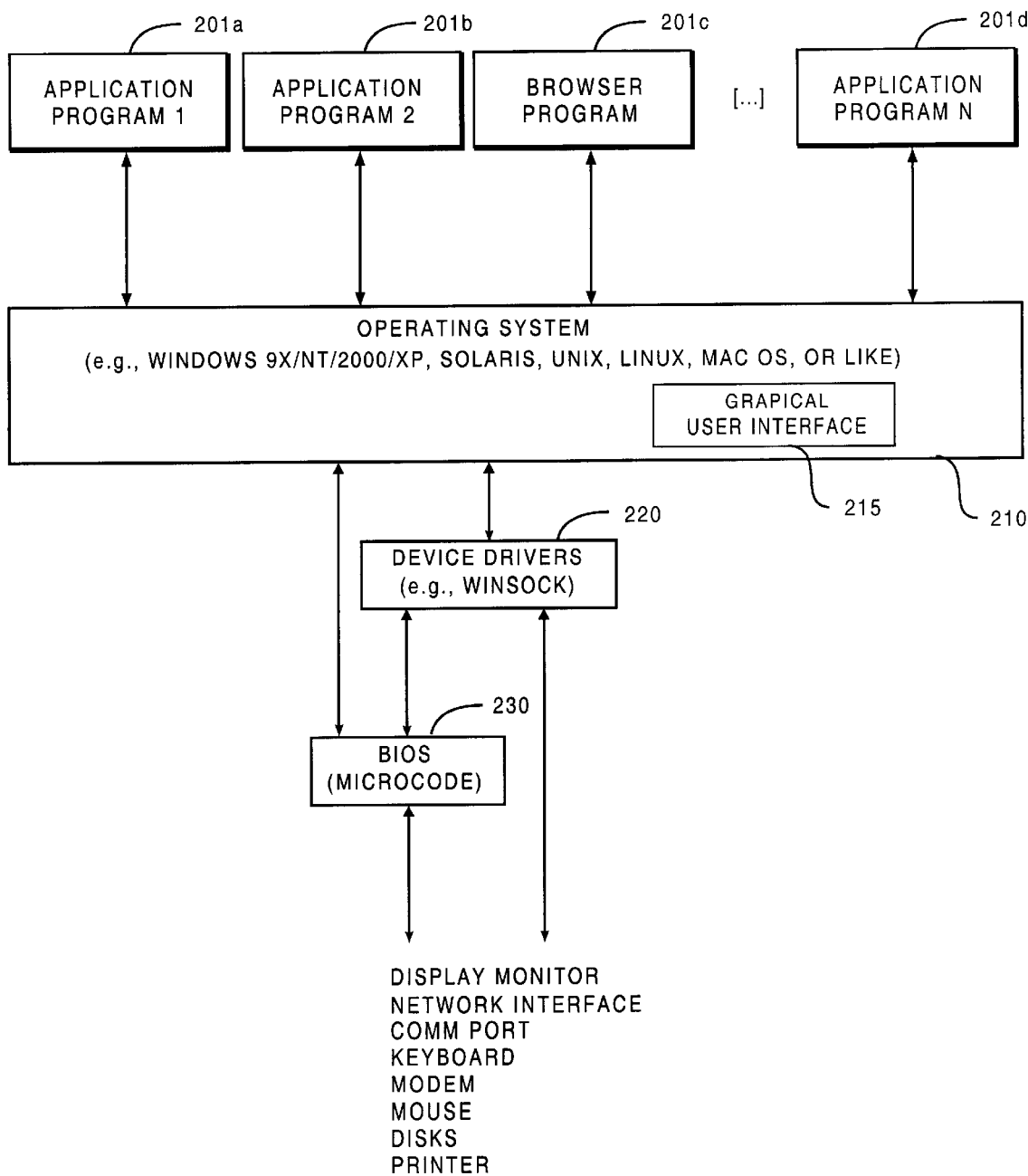
FIG. 2 is a block diagram of a software system for controlling the operation of the computer system.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100.

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft® Windows 9x, Microsoft® Windows NT, Microsoft® Windows 2000, or Microsoft® Windows XP, all available from Microsoft Corporation of Redmond, Wash. Alternatively, OS 210 can also be an alternative operating system, such as the previously-mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., middle-tier server, database server, and the like) that communicates with one or more "clients" (e.g., Java database client). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

II. High-speed Shared Memory Access between Database Middle Tier and Database Server A. Overview The present invention introduces the notion of "external engines." The database server itself has an engine. Each engine, in turn, is a separate process (i.e., executing process). A "task" or "process" is a program in execution together with virtual memory containing instructions, data, and context information, such as descriptors for open files and communication channels. In accordance with the present invention, a multitude of engines are instantiated. Each engine communicates with other engines using the interprocess communication (IPC) technique of shared memory. In this manner, Enterprise Java Beans (EJB) support may itself be implemented as an external engine. More particularly, in the currently preferred embodiment, EJB services may be provided by an existing application server, the Sybase Enterprise Application Server (hereinafter, Application Server), which classically operates in the middle tier. In accordance with the present invention, the Application Server is modified to operate as an external engine. As part of this modification, the Application Server communicates with the back-end database server (e.g., Sybase Adaptive Server Enterprise, ASE) using shared-memory IPC. Further, a "fast path" high-speed shared memory driver is provided. The fast path memory driver attaches to a shared memory segment of the back-end database (e.g., Sybase ASE) and thereafter provides rapid data exchange/sharing between separate processes (e.g., separate UNIX or Windows NT processes), using shared-memory IPC.

Typically, an EJB component communicates with a database server (e.g., Sybase ASE) using a JDBC (Java Database Connectivity) driver. JDBC, which is a specification of Sun Microsystems of Mountain View, Calif., specifies how Java programs communicate with databases. Different vendors write JDBC drivers that conform to the JDBC specification. In accordance with the present invention, the "fast path" high-speed shared memory provides JDBC connectivity, but employs shared-memory IPC communication instead of network-based communication. In this fashion, Java programs that execute within the Application Server have direct access to the in-memory data structures of the back-end database. Thus, Java programs can communicate directly with the database server over shared memory, instead of the more-traditional approach of communicating over a network.

In operation, the first client that is making a connection to the database (e.g., Java program executing at the Application Server) attaches to the back-end database shared memory. Here, a thread that is executing in the context of the Application Server (process) attaches to the back-end database shared memory. By virtue of the fact that a thread (e.g., Java program) has attached, the underlying process (i.e., Application Server process) also attaches to be shared memory. The attachment, which entails attachment to the underlying shared-memory "key" (i.e., an operating system construct), is done once. Upon attachment, all of the back-end database in-memory (public) data structures are visible to the Application Server, and thus may be accessed directly (using shared-memory IPC technique). All subsequent clients requiring connectivity to the database (i.e., all subsequent Java program threads running in the Application Server) make use of the fact that a process (i.e., the Application Server itself) has already attached to the database's memory space. These subsequent threads do not need to make individual attachments but, instead, take advantage of the existing attachment. Accordingly, all communications of the subsequent threads may occur over high-speed shared-memory IPC.

B. System Components

Figure 3:
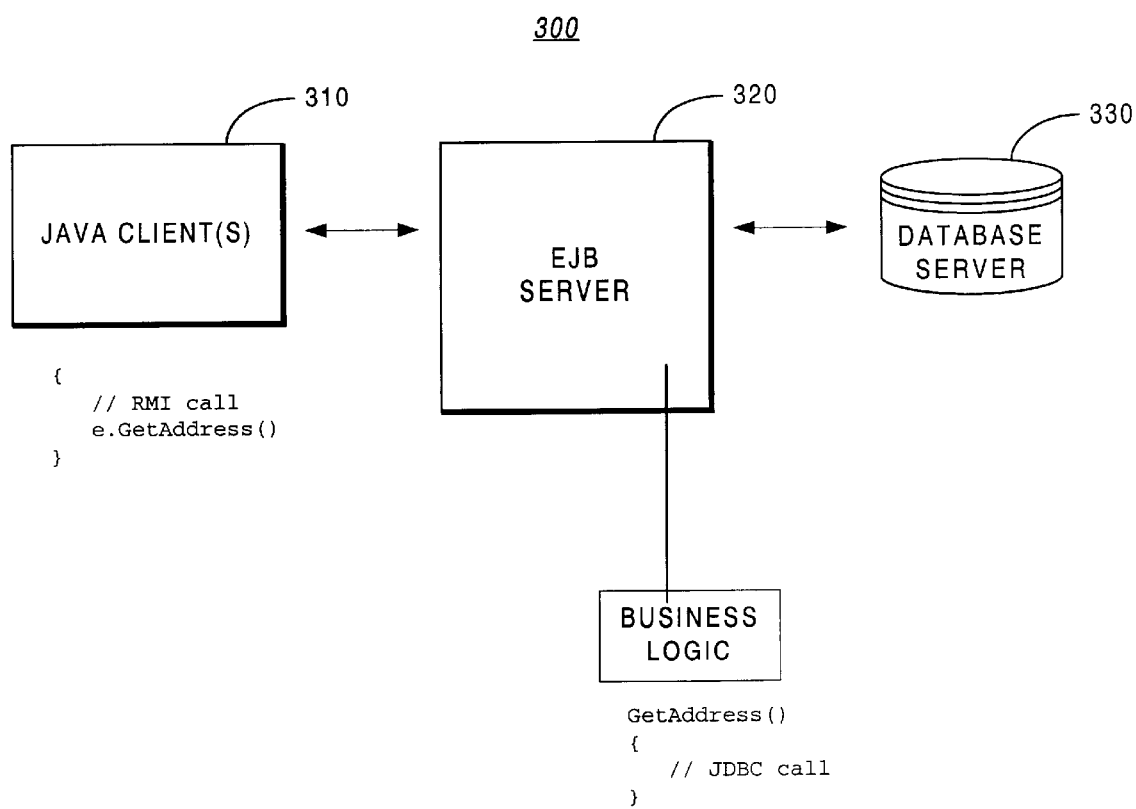
FIG. 3 is a block diagram illustrating a three-tier system that may be modified in accordance with the present invention.

FIG. 3 is a block diagram illustrating a three-tier system, which, as discussed below, will be modified in accordance with the present invention. As shown at a high level, three-tier system 300 includes one or more Java clients 310, an EJB (Enterprise Java Bean) server 320, and a back-end database server 330. The Java client(s) 310 invokes a RMI (remote method invocation) call to obtain an instance of a Java Bean component, residing at the EJB server 320, that includes the business logic of interest (i.e., of interest to the Java client). For example, a particular Java Bean component may include a method for determining an employee's address, GetAddress( ). Since the Java client obtains an instance of the component, the component's methods, although they reside at the component on the EJB server, can be made to appear as if they were local to the Java client. Suppose, for instance, that the GetAddress( ) method itself includes a JDBC call for fetching employee information (e.g., row from an Employee table) from the database server 330. The entire task of invoking the JDBC call (and therefore the corresponding JDBC driver) occurs within one or more threads that are executing at the EJB server 320. During run-time execution of the foregoing JDBC call, a database connection is established between the EJB server 320 and the database server 330. After the database server performs corresponding authentication, the required results (e.g., qualifying rows) are fetched from the database server 330 and returned to the EJB server 320, which in turn returns results back to the Java client 310.

Figure 4A:
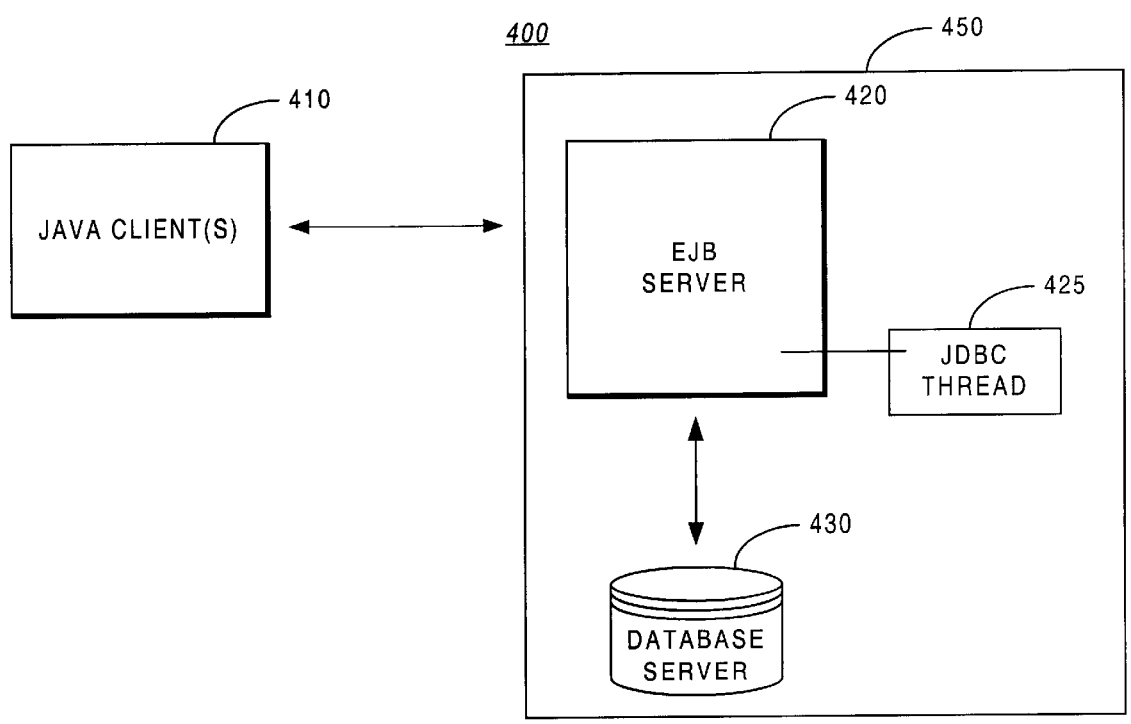
FIG. 4A is an illustration of a modified version of a high level, three-tier system of FIG. 3, such that an application server (e.g., Enterprise Java Bean server) and database server run on the same host computer and communicate via shared-memory interprocess communication.

In accordance with the present invention, the system 300 is modified such that EJB server 320 and the database server 330 run on the same host computer and communicate via shared-memory interprocess communication. This modified version is illustrated in FIG. 4A. As shown, system 400 includes one or more Java clients 410 that communicate with a host computer 450. The host computer 450 itself includes an EJB server 420 and a database server 430, all operating on the single host computer. In the currently preferred embodiment, the database server 430 launches invocation of the EJB server 420. As also shown, the host computer 450 includes a JDBC (driver) thread 425 which attaches to the database server 430, specifically by attaching to the database server's shared memory segment. In the currently preferred embodiment, the EJB server 420 comprises Sybase® Enterprise Application Server 4.0 (EAServer). The JDBC driver 425 comprises Sybase® JConnect™ JDBC driver (i.e., the existing network version of the driver, available from Sybase, Inc. of Emeryville, Calif.). The database server 430 comprises Sybase® Adaptive Server Enterprise™ (ASE). All of these are available from Sybase, Inc. of Emeryville, Calif. As described below, operation of the JDBC driver 425 is modified in accordance with the present invention to provide direct access between the middle tier (i.e., EJB server 420) and the database server 430, when the two are operating on the same host computer.

Figure 4B:
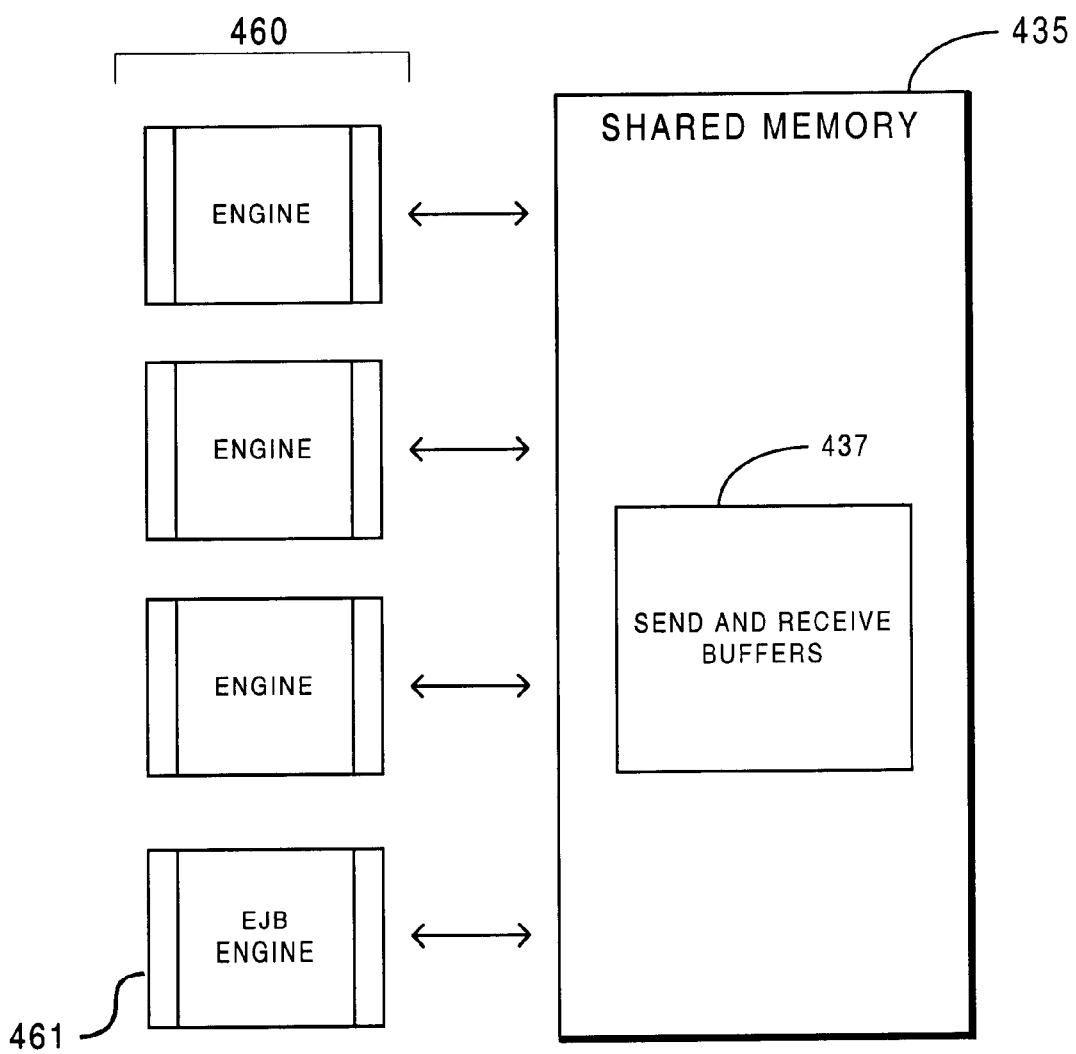
FIG. 4B is a block diagram illustrating a logical view of a shared memory segment.

FIG. 4B presents a block diagram that illustrates a logical view of the shared memory segment 435. As shown, one or more engines 460 attaches to the shared memory segment 435. One of those engines is EJB engine 461, the process associated with the EJB server; it is one of the engines that attaches to the shared memory segment 435. In operation, during procurement of the first database connection, the JDBC driver or thread attaches by attaching to the key for the shared memory segment, which itself is an operating system handle (e.g., integer or logical name) that uniquely identifies the shared memory segment. All of the database server's in-memory data structures that are visible in shared memory, including for example locks, buffers, and the like, are visible to the attached engines 460. These data structures include send and receive buffers 437, which are employed for facilitating communication between the various clients/EJB server and the database server. As previously described, by virtue of the fact that the JDBC thread is attached to the shared memory segment, the thread's process—that is, the EJB engine (process)—also attaches to the shared memory segment. Even when the initial JDBC thread terminates, the process may remain attached. As a result, all subsequent threads (of the EJB engine) can automatically benefit from this existing attachment.

If the communication were to occur over a network instead, the database server 330 would receive an incoming connection request that it would have to serve. In contrast, the approach of the present invention allows communication to occur over shared buffers within a shared memory segment. Accordingly, the database server need not manage a multitude of network connections for carrying out communication with the EJB server and the Java clients.

C. Driver Architecture

Figure 5:
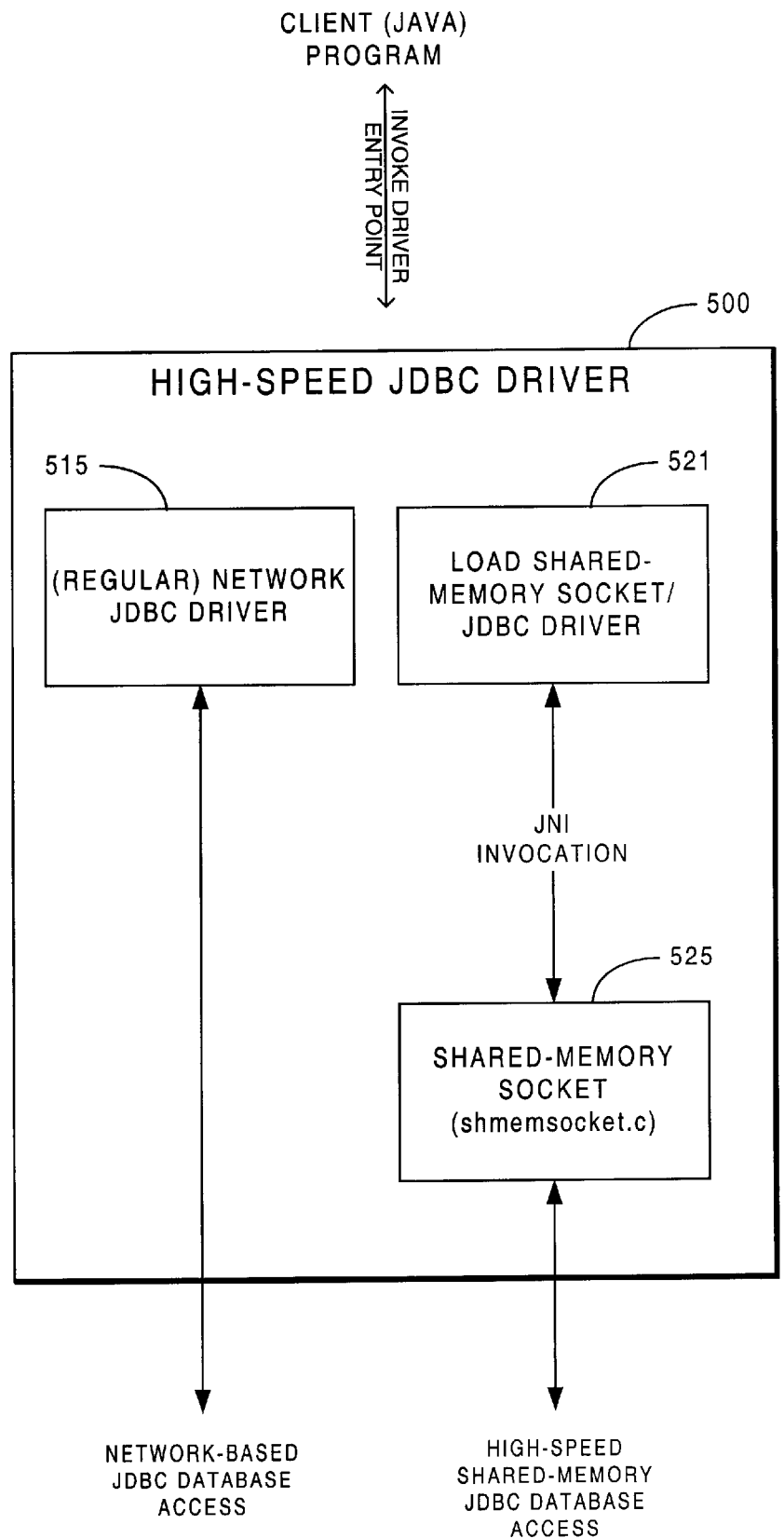
FIG. 5 is a block diagram that illustrates a high-speed JDBC driver that is enhanced to include a "socket factory" in a manner that is compatible with the JDBC standard.

As illustrated in FIG. 5, high-speed JDBC driver 500 is enhanced to include a "socket factory" as provided for under the JDBC standard. A socket itself is a logical view in which communication can occur between two tasks; the communication itself need not occur on a network. In accordance with the present invention, the JDBC driver 500 is modified to invoke a shared-memory socket 525, which is an implementation of the socket factory having communication occurring over shared memory. The JDBC driver 500 itself provides an entry point by which a Java program accesses a data source. Accordingly, a client (e.g., Java) program itself can specify whether it desires loading of a network-based JDBC driver (proper) 515 or loading of a shared-memory JDBC driver 521; this aspect is user-configurable. In the event that the normal network-based JDBC driver 515 is specified, the existing JConnect™ JDBC driver is employed to provide network-based database access (i.e., the normal scheme of data access). If, on the other hand, the shared-memory JDBC driver is specified, the load shared-memory socket/JDBC driver module 521 invokes the shared-memory socket factory 525, to provide direct data access.

The actual work of performing the shared-memory attachment and the communication between the EJB server and the database server is performed by the JDBC driver 500. The Java programming environment itself does not support attachment of processes to share-memory segments, therefore a Java Native Interface (JNI) invocation is employed in the currently preferred embodiment to provide this attachment. JNI allows invocation of low-level programming routines (e.g., in the C programming language), which, for instance, may include low-level operating system calls. Accordingly, in the currently preferred embodiment, a shared library is loaded that provides low-level operating system calls for performing the actual attachment. This represents the connection from the client's perspective.

From the database's perspective, the database needs to know that when it returns a query result (i.e., it has completed query processing) it should use shared-memory communication, instead of network-based communication. More particularly, in accordance with the present invention, the database server is alerted to the fact that a given connection is a shared-memory connection. In response, the database server updates data structures (e.g., send buffers) in its shared-memory segment, instead of returning the query results via the network-based driver.

D. Internal Operation

1. General Methodology

Figure 6A:
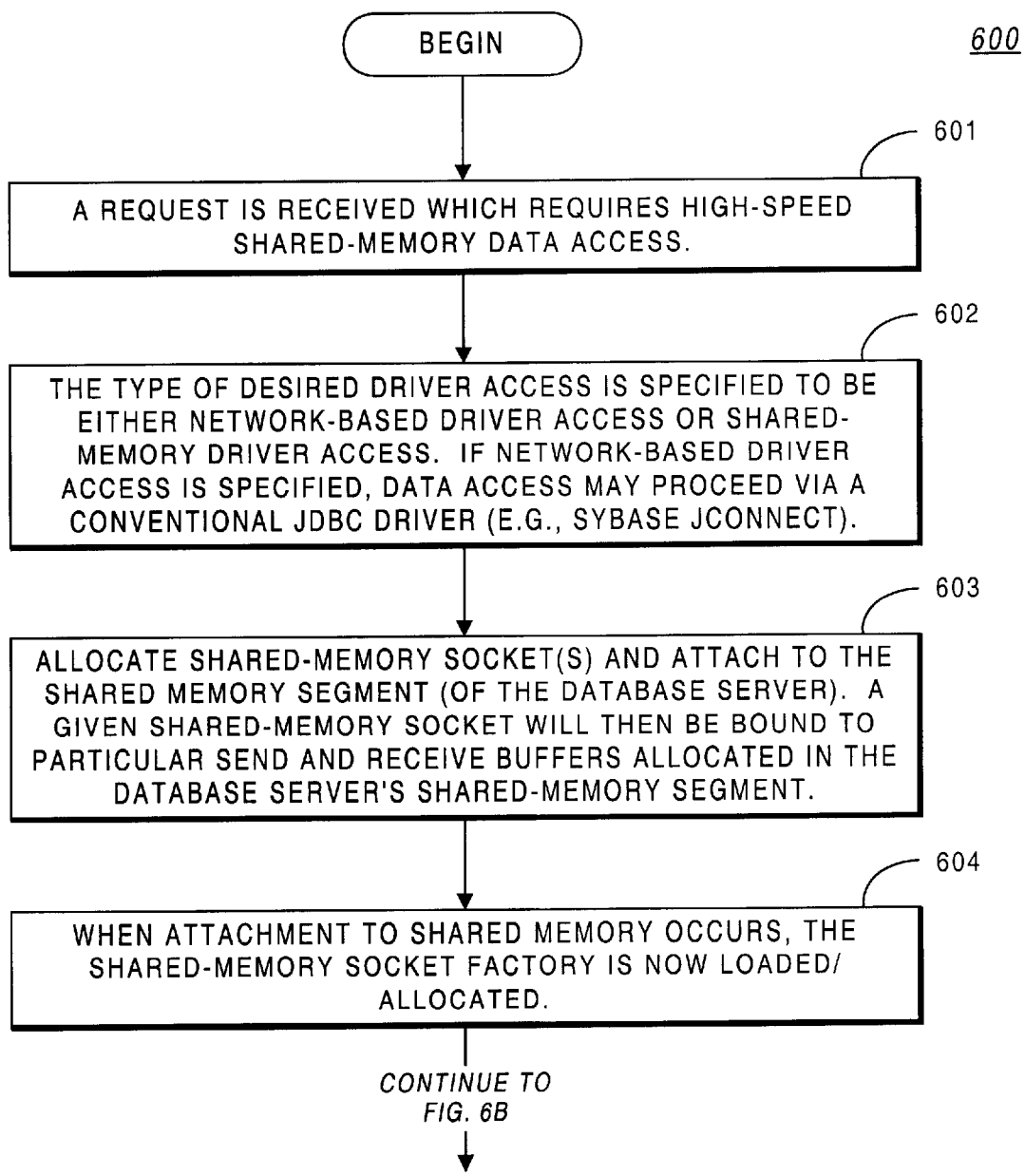

FIGS. 6A–B display a flowchart of the overall operation of the method 600 of the present invention. As shown at step 601, a request is received which requires high-speed shared-memory data access. This occurs, for example, when a Java client attempts to access business logic (e.g., method) at the middle tier (e.g., EJB server) that, in turn, attempts to establish a database connection. As indicated at step 602, the type of desired driver access is specified to be either network-based driver access or shared-memory driver access. Actual specification of driver type can occur at the connection cache level (i.e., specified globally) or at the stand-alone JDBC driver level (i.e., specified on a per driver basis). If network-based driver access is specified, data access may proceed via a conventional JDBC driver (e.g., Sybase JConnect™).

Of particular interest to the present invention is the instance where shared-memory driver access is specified. In that case, the method first attaches to shared memory at step 603 and then allocate the socket at step 604 (i.e., the shared-memory socket factory is loaded/allocated). The socket itself is a shared memory socket and not a network socket; accordingly, the corresponding socket data structure resides in the database server's shared memory. As a result, a shared memory socket will be allocated only in the instance where it is possible to attach to the database server's shared memory. Therefore, the method proceeds as follows.

As indicated at step 603, each allocated shared-memory socket is attached to the shared memory segment (of the database server), through execution of the shmattach( ) native method. In the currently preferred embodiment, as part of the foregoing socket allocation/attachment, a given shared-memory socket will next be bound to particular send and receive buffers allocated in the database server's shared-memory segment. The shared memory segment of the database server includes all key data structures of the database server that are relevant for high-speed database access, including providing access to the previously-mentioned send buffers and receive buffers. The static data member nattach (e.g., integer) is employed to indicate whether an attachment to shared memory has already occurred. This is initially set to 0 (false) and is reset to 1 (true) when actual attachment has occurred.

During creation of the shared-memory socket factory (object instance), at step 604, the shmemsocket constructor method is invoked for initializing a socket factory object. This initialization of the shared-memory socket factory includes invocation of native C programming language routines, such as allocatesocket( ), which include low-level operating system calls for allocating a given shared-memory socket for an incoming connection request. As previously described, the shared-memory socket factory itself provides a logical view of a communication entity, using shared memory. In the currently preferred embodiment, the shared-memory socket factory is defined to be a Java class that includes the following members/methods.

```
class shmemsocket ( . . . )
{
    static int nattach = 0;
    // constructor
    shmemsocket ( . . . );
    // native methods
    native shmattach ( . . . );
    native allocatesocket ( . . . );
    native read ( . . . );
    native write ( . . . );
    native close ( . . . );
    // . . .
}
```

Once the shared-memory socket factory has been established and one or more shared-memory sockets have been allocated, the sockets may be employed for effecting high-speed shared-memory communication with the database server.

For a given shared-memory communication socket, the native methods read( ) and write( ) may be employed for reading to and writing from the given shared-memory communication socket, respectively, as shown at step 605. Finally, as indicated by step 606, after a given high-speed data access (connection) is no longer required, the corresponding shared-memory socket may be closed by invoking the close( ) native method, which performs housekeeping necessary for closing a socket. Once a shared-memory socket is closed, it is in effect placed back in a pool of available shared-memory sockets. The foregoing process may continue such that shared-memory sockets are employed for database server connection requests. In the event that the EJB server itself is shut down, all resources employed for the shared-memory sockets and factory are freed, including freeing system resources employed for attaching to the database server's shared-memory segment.

2. Usage of Spin Locks

Given that multiple processes have access to shared data structures, concurrency control is required for preventing data corruption. In the currently preferred embodiment, spin locks are employed for providing this concurrency control. A "spin" lock is a well-known SMP (symmetric multi-processor) synchronization mechanism employed for controlling access to lower-level, system critical resources. Their use will be discussed in greater detail. Thus, spin locks may be used with shared memory to help synchronize multiple threads/processes in their use of shared data structures.

In contrast to transactional locks, "spin" locks operate at a lower level (i.e., at the operating system level) to control system-critical resources. These locks are characterized by the fact that a task will continue to "spin"—that is, continue to execute—if a resource is not immediately available (i.e., if the lock is not immediately granted). Ordinarily, when a task requests a lock, such as a transactional lock, the requesting task will "sleep" on the lock if it is not immediately available (e.g., the lock is currently held by another task). When "sleeping," the task is in effect placed in a suspended state until some point in time when it is "awakened." For instance, a task sleeping on a lock will be awakened when the underlying database management system is ready to grant the lock (and, accordingly, grant access to the desired data structure). When a task is put to "sleep," the underlying system switches tasks, from the now sleeping one to one that is awake. In this manner, processor resources can be conserved: a sleeping task consumes no processor resources while sleeping.

A task or context switch itself is not cost-free: system resources are required for swapping out the context of one task for another. For instance, the then-current state of the task to be put to sleep must be stored, while the system switches to another task. Once the task is awakened, the system must restore the state information for the awakening task. For certain system-critical resources, the overhead incurred with such a task switch is unacceptable. By spinning instead of sleeping, a task can avoid the overhead and cost of a context switch. To ensure that waiting tasks do not spin too long, spin locks typically contain only very few instructions, so that they are held for only a very short duration. Spin locks are employed within the system of the present invention to control access to low-level system resources, such as important lock management data structures that are shared.

When a process (e.g., external engine) requires access to a shared data structure, that process "takes out" a corresponding spin lock (i.e., spin lock that protects that shared data structure). While a process or thread holds a spin lock on a given shared data structure, other processes or threads are blocked from access to that given shared data structure— that is, the other processes or threads cannot acquire the spin lock that protects the given shared data structure. After a process or thread has completed operation on the given data structure, the corresponding spin lock is released, thereby making the shared data structure available to another process or thread.

3. Usage of Semaphores

As an additional consideration when executing multiple processes, situations may arise where a given process is temporarily put to "sleep." For example, a client process (e.g., JDBC client thread) may be temporarily put to sleep while it is waiting for a response from the database server. Once the database server has responded, the client process may be awakened to process the database server's response. This coordination or synchronization of processes may occur through use of standard operating system-provided constructs, such as semaphores. A "semaphore" is an indicator, such as a flag, used to govern access to shared system resources, for maintaining order among processes that are competing for use of resources. Semaphores can be employed to indicate event completion.

Appended herewith as Appendix A are source code listings in the C/C++ programming language, providing further description of the present invention. An appropriate development environment for compiling/linking the source code listings is available from a variety of vendors, including Microsoft Corporation of Redmond, Wash., Borland Software Corporation of Scotts Valley, Calif., and Sybase, Inc. of Emeryville, Calif.

While the invention is described in some detail with specific reference to a single preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a database system, a method for establishing high-speed communication between an application server and a database server, the method comprising:
   executing both the application server and the database server on a single host computer;
   establishing a shared memory controlled by the database server, including establishing send and receive buffers in the shared memory for transmitting information to and from said database server;
   attaching a communication thread to said shared memory control by the database server;
   after attachment of the communication thread to the shared memory, creating a communication socket facilitating communication between the application server and the database server using the shared memory; and thereafter
   effecting communication between the application server and the database server through said communication socket.

2. The method of claim 1, wherein said send and receive buffers return query results to the application server.

3. The method of claim 1, wherein said application server accesses said send and receive buffers directly.

4. The method of claim 1, wherein said application server accesses said send and receive buffers without resorting to network-based access.

5. The method of claim 1, wherein single host computer includes memory accessible by the database server and the application server.

6. The method of claim 1, wherein the database server includes Structured Query Language (SQL) support and the application server includes Enterprise Java Beans (EJB) support.

7. The method of claim 1, wherein the application server is also in communication with a plurality of database clients.

8. The method of claim 7, wherein some of said database clients comprise Java clients executing database applications.

9. The method of claim 1, wherein said step of effecting communication between the application server and the database server through said communication socket includes:
   employing shared-memory interprocess communication (JPC) for effecting high-speed communication between the application server and the database server.

10. The method of claim 1, wherein said database system comprises at least a three-tier database system, with said application server serving as a second tier, said database server serving as a third tier, and one or more database clients serving as a first tier.

11. The method of claim 1, wherein said communication thread comprises a database connectivity driver.

12. The method of claim 11, wherein said database connectivity driver includes JDBC (Java database connectivity) support.

13. The method of claim 1, wherein said communication thread executes within the context of the application server.

14. The method of claim 1, wherein said attaching step includes attaching to a shared-memory key for said shared memory.

15. The method of claim 14, wherein said shared-memory key is controlled by an operating system for the host computer.

16. The method of claim 1, wherein upon attachment of the communication thread to the shared memory, all of the database server's public data structures are accessible to the application server.

17. The method of claim 1, wherein upon attachment of the communication thread to the shared memory, the application server itself attaches to the shared memory.

18. The method of claim 1, wherein upon attachment of the communication thread to the shared memory, the application server itself and all subsequent client threads executing within the context of the application server automatically attach to the shared memory.

19. The method of claim 18, wherein all said subsequent client threads communicate with the database server over high-speed shared-memory interprocess communication.

20. The method of claim 1, wherein said application server includes business logic for the database system.

21. The method of claim 1, wherein a database client may optionally specify network-based communication with the database server.

22. The method of claim 1, wherein said communication socket provides a logical view of a communication entity, using shared memory.

23. The method of claim 1, further comprising:
   ceasing execution of the application server; and
   freeing all resources employed for said communication socket upon cessation of execution of the application server.

24. The method of claim 1, further comprising:
   using a locking mechanism to protect integrity of data structures that are concurrently accessed within said shared memory.

25. The method of claim 1, further comprising:
   using a semaphore mechanism to temporarily put to sleep a client process that is waiting for a response from the database server.

26. The method of claim 1, wherein the database server may communicate with the application server without establishing network connections.

27. A multi-tier database system with high-speed connectivity comprising:
   a first tier comprising clients executing database applications;
   a second tier comprising an application server executing business logic;
   a third tier comprising a database server providing back-end database support, said second tier and said third tier residing on a single host computer, said database server controlling a shared memory, wherein said shared memory includes send and receive buffers for sending information to and retrieving information from the database server; and
   a database connectivity driver providing shared-memory interprocess communication between said application server and said database server.

28. The system of claim 27, wherein said clients comprise Java applications capable of invoking components residing at the second tier.

29. The system of claim 27, wherein said application server includes components storing business logic for the database system.

30. The system of claim 29, wherein said components storing business logic include Enterprise Java Beans-compatible components.

31. The system of claim 27, wherein said database server comprises an SQL-compatible database server.

32. The system of claim 27, wherein said shared memory comprises a memory segment allocated on said single host computer.

33. The system of claim 27, wherein said database connectivity driver comprises a thread that executes within a context of the application server.

34. The system of claim 33, wherein said database connectivity driver attaches to said shared memory, whereupon said application server automatically attaches to the shared memory by virtue of the database connectivity driver executing within the context of the application server.

35. The system of claim 28, wherein said database connectivity driver invokes a shared-memory socket providing shared-memory interprocess communication between the application server and the database server.

36. The system of claim 27, wherein said database connectivity driver alternately provides network-based communication between the application server and the database server, in instances where database clients explicitly request network-based communication.

37. The system of claim 27, wherein said database server includes program logic indicating when communication with the application server occurs via shared-memory interprocess communication.

38. The system of claim 28, wherein the database server returns query results to the application server via said send and receive buffers.

39. The system of claim 27, wherein database connectivity is achieved between the database server and the application server without employing a network connection between the two.

40. The system of claim 27, further comprising:
    a concurrency control mechanism preserving integrity of data structures subject to concurrent access.

41. The system of claim 40, wherein said concurrency control mechanism includes spin locks for protecting access to data structures.

42. The system of claim 27, wherein communication between the first tier and the second tier occurs via network-based communication.

43. The system of claim 27, wherein said database connectivity driver first attaches to the shared memory controlled by the database server, whereupon the application server automatically attaches to the shared memory as well.

* * * * *